US009429792B2

(12) United States Patent
Jia et al.

(10) Patent No.: US 9,429,792 B2
(45) Date of Patent: Aug. 30, 2016

(54) BACKLIGHT, DISPLAY DEVICE AND METHOD FOR CONTROLLING BACKLIGHTING THEREOF

(71) Applicants: BOE TECHNOLOGY GROUP CO., LTD, Beijing (CN); BEIJING BOE VISION-ELECTRONIC TECHNOLOGY CO., LTD., Beijing (CN)

(72) Inventors: Zhishuai Jia, Beijing (CN); Changgui Fu, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 39 days.

(21) Appl. No.: 14/472,262

(22) Filed: Aug. 28, 2014

(65) Prior Publication Data

US 2015/0378212 A1 Dec. 31, 2015

(30) Foreign Application Priority Data

Jun. 30, 2014 (CN) .......................... 2014 1 0307642

(51) Int. Cl.
*G02F 1/13357* (2006.01)
*G02F 1/1335* (2006.01)
(52) U.S. Cl.
CPC ... *G02F 1/133602* (2013.01); *G02F 1/133603* (2013.01); *G02F 1/133611* (2013.01); *G02F 2001/133613* (2013.01)
(58) Field of Classification Search
CPC ........ F21V 19/02; F21V 21/14; F21V 21/30; G02B 6/0091; G02F 1/133603; G02F 1/133608; G02F 1/133611

USPC .......................................... 362/418
See application file for complete search history.

(56) References Cited

U.S. PATENT DOCUMENTS

| 2010/0296266 A1* | 11/2010 | Dussault ................. F21V 29/77 362/84 |
| 2012/0057347 A1* | 3/2012 | Wendt ..................... F21V 14/02 362/249.02 |
| 2013/0223066 A1* | 8/2013 | Kim .................. G02F 1/133608 362/235 |

FOREIGN PATENT DOCUMENTS

| CN | 102214446 | 10/2011 |
| CN | 103423675 | 12/2013 |

OTHER PUBLICATIONS

Chinese Office Action with English Language Translation, dated Dec. 24, 2015, Chinese Application No. 201410307642.6.
Chinese Office Action with English Language Translation, dated May 5, 2016, Chinese Application No. 201410307642.6.

* cited by examiner

*Primary Examiner* — Anh Mai
*Assistant Examiner* — Steven Horikoshi
(74) *Attorney, Agent, or Firm* — Blakely Sokoloff Taylor & Zafman LLP

(57) ABSTRACT

The present disclosure provides a backlight, a display device and a method for controlling backlighting thereof. The present disclosure relates to the field of display technology, and enables a display panel with uniform brightness. The backlight comprises a backplate and a light emitting unit which is arranged on a surface of the backplate. The light emitting unit comprises a substrate and a plurality of light sources which are fixed onto the substrate. The substrate comprises an attached part which is fixed to a central area of the surface of the backplate and a bendable part which forms a preset angle with a non-central area of the surface of the backplate.

16 Claims, 5 Drawing Sheets

| when an observation distance is smaller than or equals to a predefined distance, a triggering module sends a first controlling signal | —S301 |

| according to the first controlling signal, the processing module energizes the first and/or second magnetic field component, so that the first and second magnetic field component are separated from each other to form a preset angle | —S302 |

Fig. 11

| when the observation distance is larger than the predefined distance, the triggering module sends a second controlling signal | —S401 |

| according to the second controlling signal, the processing module de-energizes the first and/or second magnetic field component, so that the first and second magnetic field component are attracted to each other to eliminate the preset angle | —S402 |

Fig. 12

BACKLIGHT, DISPLAY DEVICE AND METHOD FOR CONTROLLING BACKLIGHTING THEREOF

FIELD OF THE INVENTION

The present disclosure relates to the field of display technology, and particularly to a backlight, a display device and a method for controlling backlighting thereof.

BACKGROUND OF THE INVENTION

A LCD (liquid crystal display) is a passive light emitting device, in which a BLU (Backlight Unit) is required to provide a light source for enabling the LCD to display an image. Currently, the popular backlights for LCD comprise CCFL (cold cathode fluorescent lamp) and LED (light emitting diode). LED has been increasingly accepted as a backlight due to its advantages of high brightness, high color purity, long service life, high reliability, and free from mercury pollution.

A LED backlight can be classified into a direct type and a side type. In the side type, the light source is placed at a side of the display panel. In the direct type, the light source is arranged at a lower surface (i.e., the non-display surface) of the display panel. Particularly, a construction for a LED backlight of the direct type is shown in FIG. 1.

However, as for the existing LED backlight of the direct type, LED strips 110 act as light sources for emitting light ray. When light ray perceived by human eyes 111 is perpendicular to a display panel 112, the perpendicular light ray has the largest brightness at its intersection point with the display panel 112, because most of the light ray emitted by the light source 110 impinges on a central area of the display panel 112. When light ray perceived by human eyes 111 forms an angle $\alpha$ ($0° \leq \alpha \leq 90°$) with the normal of the display panel 112, the light ray in the direction of $\alpha=0$ exhibits the largest intensity. The brightness of light ray at its intersection point with the display panel 112 decreases with the increase of $\alpha$. In this manner, the brightness across the display panel 112 is not uniform. For instance, when human eyes 111 observe the display panel 112 at a small distance, the brightness at point C is relatively high, while the brightness at point A and point B is relatively low. Or, as shown in FIG. 2, when a test equipment 113 performs a display test on the display panel 112, a lens of the test equipment 113 lie in the perpendicular direction with respect to point C' on the display panel 112, while forms an angle with point A' and point B'. Thus, the brightness at point C' is relatively high, while the brightness at other points is relatively low. In this manner, the average brightness across the display panel 112 will be reduced, thus decreasing the energy efficiency of the display test. In addition, in the practical observation, this will result in a non-uniform brightness of the display panel perceived by the user, thus affecting the display quality.

SUMMARY OF THE INVENTION

The present disclosure provides a backlight, a display device and a method for controlling backlighting thereof, which can avoid or at least mitigate one or more problems as discussed above.

To this end, in an aspect of the present disclosure, there is provided a backlight comprising a backplate and a light emitting unit which is arranged on a surface of the backplate, wherein the light emitting unit comprises a substrate and a plurality of light sources which are fixed onto the substrate, and the substrate comprises an attached part which is fixed to a central area of the surface of the backplate and a bendable part which forms a preset angle with a non-central area of the surface of the backplate.

In another aspect of the present disclosure, there is provided a display device comprising the above mentioned backlight.

In yet another aspect of the present disclosure, there is provided a method for controlling backlighting of a display device, wherein the display device comprises a backlight, the backlight comprises a backplate and a light emitting unit which is arranged on a surface of the backplate, wherein the light emitting unit comprises a substrate and a plurality of light sources which are fixed onto the substrate, and the substrate comprises an attached part which is fixed to a central area of the surface of the backplate and a bendable part which forms a preset angle with a non-central area of the surface of the backplate, wherein the backlight controlling method comprises adjusting the preset angle of the bendable part according to an observation distance.

The present disclosure provides a backlight, a display device and a method for controlling backlighting thereof. The backlight comprises a backplate and a light emitting unit which is arranged on a surface of the backplate. The light emitting unit comprises a substrate and a plurality of light sources which are fixed onto the substrate. The substrate comprises an attached part which is fixed to a central area of the surface of the backplate and a bendable part which forms a preset angle with a non-central area of the surface of the backplate. In this manner, when the backlight is adopted in a display device, the bendable part with the preset angle can modify the exit angle of light ray, so that more light ray will be emitted at two ends of the display panel. That is, it is possible to compensate light ray at areas of the display panel where there is less light ray. As a result, a display panel with uniform brightness is achieved, and the display effect and the energy efficiency of the display test are improved.

BRIEF DESCRIPTION OF THE DRAWINGS

Several technical solutions of the present disclosure will be described in more detail below with reference to the accompanying drawings in order for those skilled in the art to be able to carry out the present disclosure. The present disclosure may, however, be embodied in many different forms and should not be construed as limited to embodiments set forth herein. These embodiments do not limit the present disclosure, but the present disclosure is only limited by the appended claims.

FIG. 11 is a flow chart illustrating yet another method for controlling backlighting of a display device according to the present disclosure; and FIG. 12 is a flow chart illustrating still another method for controlling backlighting of a display device according to the present disclosure.

DETAILED DESCRIPTION OF THE INVENTION

The present disclosure will be elucidated hereinafter in details with reference to the accompanying drawings and embodiments. Apparently, these embodiments only constitute some embodiments of the present disclosure. The scope of the present disclosure is by no means limited to embodiments as set forth herein. In addition, the accompanying drawings only intend to illustrate the present disclosure schematically, are not necessarily drawn to scale, and do not intend to limit the present disclosure in any manner.

Figure 3:
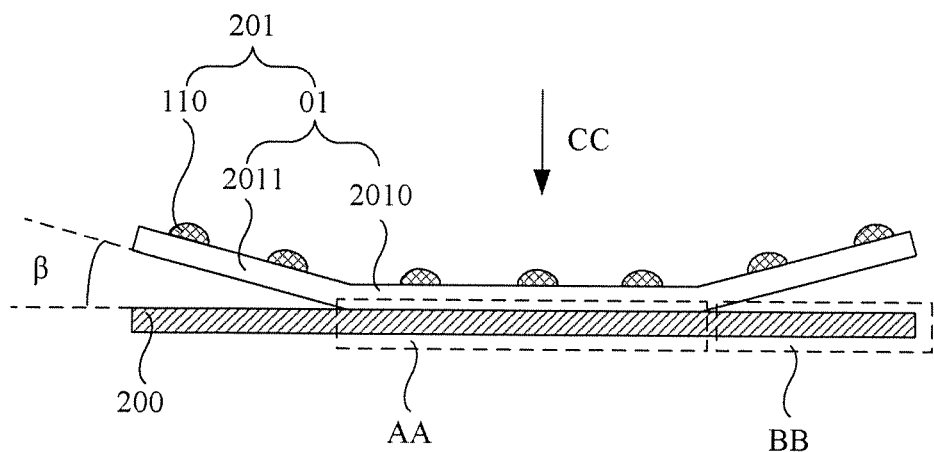
FIG. 3 is a structural diagram of a backlight according to the present disclosure.

As shown in FIG. 3, the backlight of the present disclosure comprises a backplate 200 and a light emitting unit 201 which is arranged on a surface of the backplate 200. The light emitting unit 201 comprises a substrate 01 and a plurality of light sources 110 which are fixed onto the substrate 01. The substrate 01 comprises an attached part 2010 which is fixed to a central area AA of the surface of the backplate 200 and a bendable part 2011 which forms a preset angle $\beta$ with a non-central area BB of the surface of the backplate 200. Besides, the backlight can further comprise an angle controlling unit 300 (not shown in FIG. 3), which is used to adjust the preset angle $\beta$ according to an observation distance H1.

Particularly, in case the backlight is applied to a display device, the observation distance H1 is defined as a distance between a user and a display panel 112 of the display device. When the observation distance H1 is relatively small, the angle controlling unit 300 can form the bendable part 2011 with the preset angle $\beta$ in the backlight. Thus, the exit angle of light ray is modified by means of the bendable part 2011, so that more light ray will irradiate two ends of the display panel 112, thereby compensating light ray in the area with less light ray. When the observation distance H1 is relatively large, it is not compensate light ray to compensate light ray. In this case, the preset angle $\beta$ can be reduced or eliminated. Herein, eliminating the preset angle $\beta$ refers to that the preset angle $\beta$ is zero. In this manner, observation effect experienced by the user can reach the optimum state in various observation scenarios.

Figure 1:
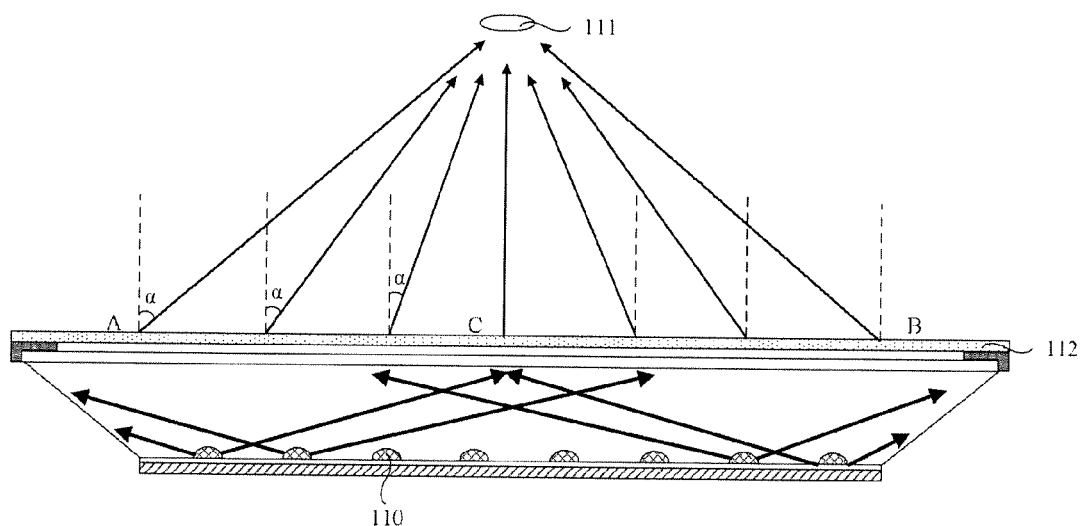
FIG. 1 is a structural diagram of a display panel in the prior art.
Figure 2:
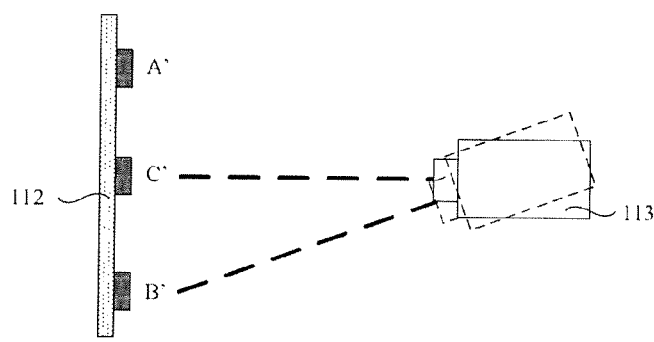
FIG. 2 is a diagram illustrating a test equipment performs a test on a display panel in the prior art.
Figure 4:
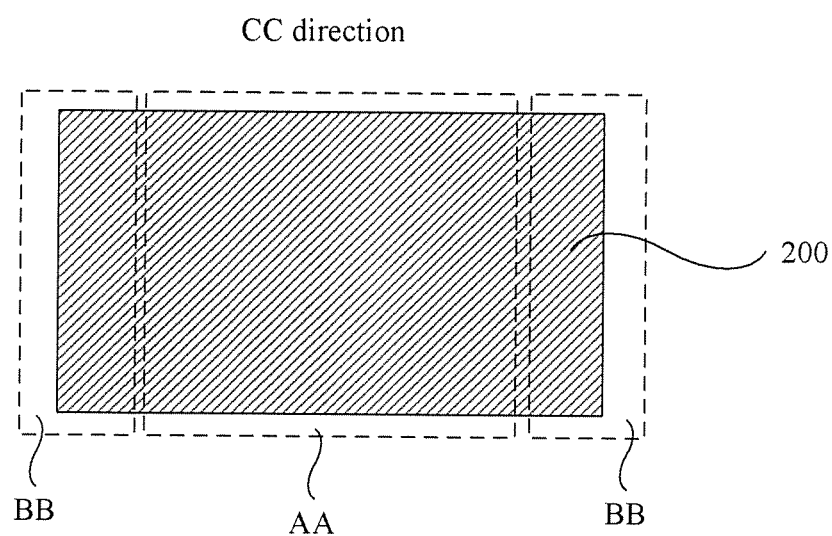
FIG. 4 is a structural diagram of a backplate according to the present disclosure.

As shown in FIG. 4 (a view along the CC direction in FIG. 3), a central area AA of the surface of the backplate 200 refers to a central display area of the display panel 112 to which the central area of the backplate 200 shown in FIG. 3 corresponds to. A non-central area BB of the surface of the backplate 200 refers to areas at two ends of the display panel 112 to which areas at two ends of the backplate 200 correspond to. In the prior art, areas at two ends of the display panel 112 shown in FIG. 1 refer to the areas where point A and point B are located, and relatively less light ray is incident to human eyes 111 or the test equipment 113 at these areas. Therefore, the bendable part 2011 with the preset angle $\beta$ can modify the exit angle of light ray, thereby improving the exiting ratio of light ray at two ends of the display panel 112, i.e. at point A and point B shown in FIG. 1, and compensating light ray in the above-mentioned area.

It is noted that the attached part 2010 is fixed to the central area AA of the surface of the backplate 200. This can indicate that the attached part 2010 can be fixed to the central area AA of the surface of the backplate 200 by using screw(s), bolt(s), slot(s), or by attaching. However, the present disclosure does not intend to be restricted in this regard.

The present disclosure provides a backlight comprising a backplate and a light emitting unit which is arranged on a surface of the backplate. The light emitting unit comprises a substrate and a plurality of light sources which are fixed onto the substrate.

The substrate comprises an attached part which is fixed to a central area of the surface of the backplate and a bendable part which forms a preset angle with a non-central area of the surface of the backplate. In this manner, when the backlight is adopted in a display device, the bendable part with the preset angle can modify the exit angle of light ray, so that more light ray can be emitted at two ends of the display panel. That is, it is possible to compensate light ray at areas of the display panel where there is less light ray. As a result, a display panel with uniform brightness is achieved, and the display effect and the energy efficiency of the display test are improved.

The preset angle $\beta$ can lie in a range of $0° \leq \beta < 90°$. When the preset angle $\beta$ is $0°$, the bendable part 2011 is attached with the backplate 200, In this manner, it is not necessary to compensate light ray at areas of two ends of the display panel 112 where point A and point B are located by means of the bendable part 2011. When the preset angle $\beta$ is larger than or equals to $90°$, light emitted by the bendable part 2011 no longer emits in a direction away from the backplate. In this manner, the light exiting ratio of the backlight is decreased, thus degrading the quality of the display device. Therefore, the preset angle $\beta$ can be set in a range of $0° \leq \beta < 90°$. For instance, when the backlight is applied to display device, a width of the side opposite to the preset angle $\beta$ (i.e., a bending height of an end of the bendable part 2011) can be smaller than or equal to a light mixing distance of the display device. In this manner, it is possible to compensate light ray in the display panel 112 by means of the preset angle $\beta$, without affecting the normal display of the display device.

Therefore, when the backlight is applied to display device, the preset angle $\beta$ can be adjusted in the range of $0° \leq \beta < 90°$, according to an observation distance H1 between a user and the display panel 112 of the display device. For instance, when the observation distance H1 is relatively small (smaller than 5 times of the width of the display panel 112), since angles a between light ray which is emitted at two ends of the backlight and perceived by the user and the normal direction of the display panel 112 are relatively large, brightness at two ends of the display panel 112 is relatively low. In this case, the preset angle $\beta$ can be increased to decrease the angle $\alpha$, thus improving brightness at two ends of the display panel 112. For instance, when the observation distance H1 is relatively large (larger than 5 times of the width of the display panel 112), since differences among angles between each light ray which is perceived by the user and the normal direction of the display panel 112 are very small, it is not necessary to compensate light ray at two ends of the display panel 112 by using the preset angle $\beta$ to change direction of light ray emitted by the backlight.

Figure 5:
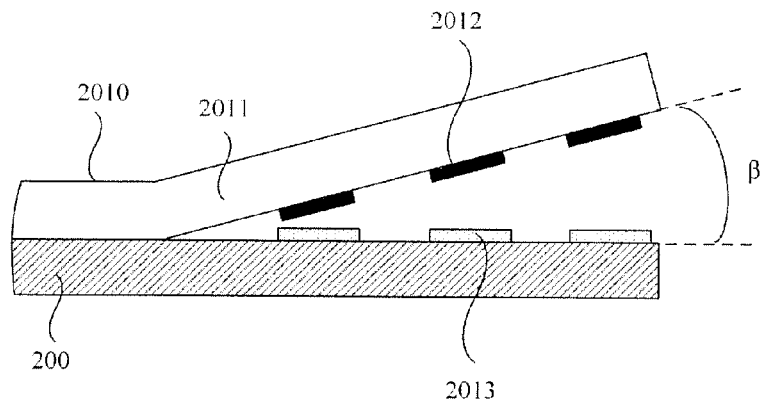
FIG. 5 is an enlarged structural diagram of a backlight according to the present disclosure.

As shown in FIG. 5, a surface of the bendable part 2011 which is close to the backplate 200 can be provided with at least one first magnetic field component 2012. A surface of the backplate 200 which is close to the bendable part 2011 can be provided with at least one second magnetic field component 2013 at a position corresponding to the first magnetic field component 2012. When the first magnetic field component 2012 and/or the second magnetic field component 2013 is energized, the first magnetic field component 2012 and the second magnetic field component 2013 are attracted to each other completely or partially, so as to decrease or eliminate the preset angle β.

For instance, upon being energized, the first magnetic field component 2012 and the second magnetic field component 2013 can have the opposite magnetic properties, so that in the energized state the first magnetic field component 2012 and the second magnetic field component 2013 can be attracted and thus attached to each other. Particularly, when all of first magnetic field components 2012 and all of the second magnetic field components 2013 are attracted to each other, the light emitting unit 201 is completed attached to the surface of the backplate 200, so that the preset angle β is zero, i.e., the preset angle β is eliminated. When some of the first magnetic field components 2012 and some of the second magnetic field components 2013 are attracted to each other(e.g., in FIG. 5, the left-most first magnetic field component 2012 and the corresponding second magnetic field component 2013 are attracted and thus attached to each other, while the remaining first magnetic field components 2012 and the second magnetic field components 2013 are separated from each other), the light emitting unit 201 is partially attached to the surface of the backplate 200 so as to decrease the preset angle β. In this manner, the preset angle β can be adjusted as necessary by controlling the attracting/attaching state between the first magnetic field component 2012 and the second magnetic field component 2013.

In a variation, a surface of the bendable part 2011 which is close to the backplate 200 is provided with at least one first magnetic field component 2012. A surface of the backplate 200 which is close to the bendable part 2011 is provided with at least one second magnetic field component 2013 at a position corresponding to the first magnetic field component 2012. In this case, when the first magnetic field component 2012 and/or the second magnetic field component 2013 are energized, the first magnetic field component 2012 and the second magnetic field component 2013 are separated from each other completely or partially.

For instance, upon being energized, the first magnetic field component 2012 and the second magnetic field component 2013 can have different magnetic properties, so that the first magnetic field component 2012 and the second magnetic field component 2013 can be repelled and thus separated from each other.

It is noted that the present disclosure is elucidated by referring to an example in which the first magnetic field component 2012 and the second magnetic field component 2013 have opposite magnetic properties, so that the first magnetic field component 2012 and the second magnetic field component 2013 can be attracted and thus attached to each other in the energized state.

First Embodiment

When the backlight is adopted in a display device, and the distance between human eyes 111 or the test equipment 113 and the display device is relatively small, the first magnetic field component 2012 and the second magnetic field component 2013 can be separated from each other to maintain the preset angle β. As a result, the light emitting unit 201 can compensate light ray at areas of two ends of the display panel 112 where there is less light ray by using the bendable part 2011 (areas where point A and point B are located in FIG. 1). Thus, light ray which is emitted by the backlight and perceived by human eyes 111 or the test equipment 113 is uniformly distributed. When the distance between human eyes 111 or the test equipment 113 and the display device increases gradually, differences among angles between each light ray which is perceived by human eyes 111 or the test equipment 113 and the normal of the display panel 112 decreases gradually. Therefore, the first magnetic field component 2012 and/or the second magnetic field component 2013 can be energized, so that the light emitting unit 201 is partially attached to the surface of the backplate 200 to decrease the preset angle β. As a result, a portion of the bendable part 2011 can compensate light ray at areas of two ends of the display panel 112 where there is less light ray. Besides, when the distance between human eyes 111 or the test equipment 113 and the display device is relatively large, differences among angles between each light ray which is perceived by human eyes 111 or the test equipment 113 and the normal of the display panel 112 are very small. Therefore, it is not necessary to compensate light ray in the display panel 112 by using the bendable part. Thus, the first magnetic field component 2012 and/or the second magnetic field component 2013 can be energized, so that the light emitting unit 201 is completely attached to the surface of the backplate 200 to eliminate the preset angle β.

The first magnetic field component 2012 can be composed of a ferrous coating, and the second magnetic field component 2013 can be composed of an electromagnet. In this manner, when the second magnetic field component 2013 is energized, the first magnetic field component 2012 and the second magnetic field component 2013 can be attracted to each other.

Further, the first magnetic field component 2012 can be composed of an electromagnet, and the second magnetic field component 2013 can be composed of a ferrous coating. In this manner, when the first magnetic field component 2012 is energized, the first magnetic field component 2012 and the second magnetic field component 2013 can be attracted to each other.

Further, the first magnetic field component 2012 the second magnetic field component 2013 can be composed of an electromagnet. In this manner, when the first magnetic field component 2012 and the second magnetic field component 2013 are energized, the first magnetic field component 2012 and the second magnetic field component 2013 can be attracted to each other.

Second Embodiment

Figure 6:
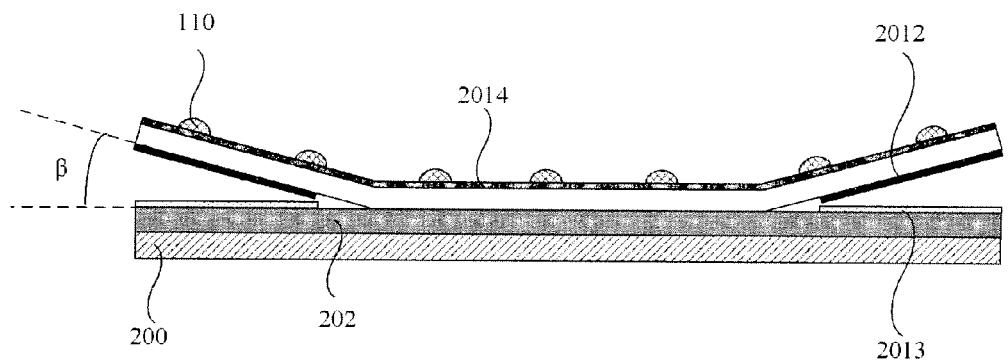
FIG. 6 is a structural diagram of another backlight according to the present disclosure.

In case the first magnetic field component 2012 and/or the second magnetic field component 2013 is composed of an electromagnet, it is also possible to control the magnitude of current to control the separating/attaching state, so as to control the magnitude of the preset angle β. For instance, as shown in FIG. 6, in case that the first magnetic field component 2012 covers the whole surface of the bendable part 2011 which is close to the backplate 200, the second magnetic field component 2013 covers the whole surface of the backplate 200 which is close to the bendable part 2011, the first magnetic field component 2012 is composed of a ferrous coating, and the second magnetic field component 2013 is composed of an electromagnet, it is possible to control the current which is fed into the second magnetic field component 2013 so as to control the magnitude of the preset angle β. Particularly, when the observation distance H1 increases gradually, it is possible to increases gradually the current which is fed into the second magnetic field component 2013. In this manner, a portion of the first magnetic field component 2012 which is close to the second magnetic field component 2013 is attracted to the second magnetic field component 2013. As the current further increases, a portion of the first magnetic field component 2012 which is far from the second magnetic field component 2013 is gradually attracted to the second magnetic field component 2013, thus gradually decreasing and finally eliminating the preset angle β. Of course, reference has been made to an example in which the preset angle β is decreased or eliminated. There exist other methods for adjusting the preset angle β by controlling the first magnetic field component 2012 and/or the second magnetic field component 2013. Although these methods are not described in details herein, they still fall within the scope of the present disclosure.

For instance, when the first magnetic field component 2012 is composed of an electromagnet, an insulating layer 202 can be arranged between the bendable part 2011 and the first magnetic field component 2012.

Further, as shown in FIG. 6, when the second magnetic field component 2013 is composed of an electromagnet, the insulating layer 202 can be arranged between the second magnetic field component 2013 and the backplate 200. In this manner, with the insulating layer 202, it is possible to prevent the electro magnetic interference, which may occur when the first magnetic field component 2012 and/or the second magnetic field component 2013 composed of an electromagnet is energized, from adversely affecting the backlight or other components in a device with the backlight (e.g. a display device).

The substrate 01 can comprise a MPCB (multilayer printed circuit board) 2014. In this manner, with the MPCB 2014, the light source 110 can be supplied with power to operate normally. Thus, the MPCB 2014 can be bended at two ends, and two ends of the light source 110 are supported by the MPCB 2014 to form the bendable part 2011 and the attached part 2010 of the light emitting unit 201.

Figure 8:
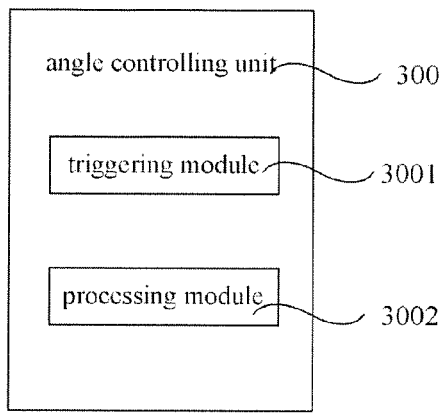
FIG. 8 is a block diagram of an angle controlling unit according to the present disclosure.

As shown in FIG. 8, the angle controlling unit 300 comprises a triggering module 3001 for sending a first or second controlling signal according to the observation distance H1; and a processing module 3002 for controlling the first magnetic field component 2012 and the second magnetic field component 2013 to be de-energized or energized according to the first or second controlling signal.

The triggering module 3001 comprises a control button, a front camera, or an infrared induction lamp remote sensing device.

When the backlight is applied to a display device, the predefined distance H2 can be 1-10 times of a width of the display panel. For instance, the predefined distance H2 can be 5 times of the width of the display panel. When the predefined distance H2 equals to the width of the display panel, the distance between the user and the display device is too small, and the observing effect and comfort is affected. When the predefined distance H2 is 10 times of the width of the display panel, the distance between the user and the display device is too large, and the user possibly can not clearly what is displayed.

Particularly, when the observation distance H1 is smaller than or equals to the predefined distance H2, the triggering module 300 sends the first controlling signal. For instance, when the observation distance H1 is smaller than or equals to the predefined distance H2, the user can press the control button, so that the control button sends the first controlling signal. Also, when the observation distance H1 of the user obtained by the front camera or the infrared induction lamp remote sensing device is smaller than or equals to the predefined distance H2, the front camera or the infrared induction lamp remote sensing device sends the first controlling signal to the processing module 3002.

Then, according to the first controlling signal, the processing module 3002 de-energizes the first magnetic field component 2012 and/or the second magnetic field component 2013, so that the first magnetic field component 3012 and the second magnetic field component 2013 are separated from each other to form the preset angle β.

Further, when the observation distance H1 is larger than the predefined distance H2, the triggering module 300 sends the second controlling signal. For instance, when the observation distance H1 is larger than the predefined distance H2, the user can press the control button, so that the control button sends the second controlling signal. Also, when the observation distance H1 of the user obtained by the front camera or the infrared induction lamp remote sensing device is larger than the predefined distance H2, the front camera or the infrared induction lamp remote sensing device sends the second controlling signal to processing module 3002.

Then, according to the second controlling signal, the processing module 3002 energizes the first magnetic field component 2012 and/or the second magnetic field component 2013, so that the first magnetic field component 2012 and the second magnetic field component 2013 are attracted to each other to eliminate the preset angle β.

Third Embodiment

As shown in FIG. 6, in case that the first magnetic field component 2012 covers the whole surface of the bendable part 2011 which is close to the backplate 200, the second magnetic field component 2013 covers the whole surface of the backplate 200 which is close to the bendable part 2011, the first magnetic field component 2012 is composed of a ferrous coating, and the second magnetic field component 2013 is composed of an electromagnet, when the observation distance H1 increases gradually, the angle controlling unit 300 can increase gradually the current which is fed into the second magnetic field component 2013. In this manner, a portion of the first magnetic field component 2012 which is close to the second magnetic field component 2013 is attracted to the second magnetic field component 2013. As the current further increases, a portion of the first magnetic field component 2012 which is far from the second magnetic field component 2013 is gradually attracted to the second magnetic field component 2013, so that the angle controlling unit 300 can decrease gradually and finally eliminate the preset angle β. Of course, reference has been made to an example in which the magnitude of the preset angle β is controlled by the angle controlling unit 300. There exist other controlling procedures for controlling the magnitude of the preset angle β. Although these controlling procedures are not described in details herein, they still fall within the scope of the present disclosure.

The present disclosure provides a display device, which can comprise any one of the above-mentioned backlight. The display device has the same beneficial effects as those for the afore-mentioned backlight, and for sake of simplicity, these beneficial effects will not be described hereinafter, since they have been described with regard to the backlight.

Figure 7:
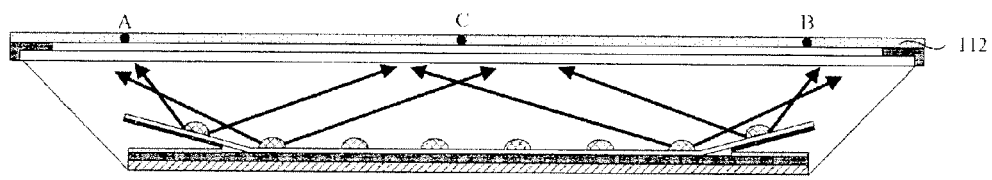
FIG. 7 is a structural diagram of a display device according to the present disclosure.

As shown in FIG. 7, when the display device adopts the backlight, the exit angle of light ray can be modified by the bendable part 2011, and light ray emitted at point A and point B at two ends of the display panel 112 can be increased, so that it is possible to compensate effectively light ray at areas where point A and point B are located, thus decreasing its difference between the brightness at point C, and providing a uniform brightness across the display panel 112.

In the present disclosure, the display device can comprise a liquid crystal display device. For instance, the display device can be a LCD, LCD TV, digital frame, mobile phone, tablet computer, or any product or component with a display function.

The present disclosure provides a display device, which comprises a backlight. The backlight comprises a backplate and a light emitting unit which is arranged on a surface of the backplate. The light emitting unit comprises a substrate and a plurality of light sources which are fixed onto the substrate. The substrate comprises an attached part which is fixed to a central area of the surface of the backplate and a bendable part which forms a preset angle with a non-central area of the surface of the backplate. In this manner, when the backlight is adopted in a display device, the bendable part with the preset angle can modify the exit angle of light ray, so that more light ray can be emitted at two ends of the display panel. That is, it is possible to compensate light ray at areas of the display panel where there is less light ray. As a result, a display panel with uniform brightness is achieved, and the display effect and the energy efficiency of the display test are improved.

The present disclosure provides a method for controlling backlighting of a display device, comprising: adjusting the preset angle β according to an observation distance H1 by using the angle controlling unit 300.

The observation distance H1 is a distance between human eyes 111 or the test equipment 113 and the display panel 112 of the display device.

The present disclosure provides a method for controlling backlighting of a display device, comprising: adjusting a preset angle according to an observation distance by using an angle controlling unit. In this manner, with the preset angle, it is possible to modify the exit angle of light ray emitted by the backlight, increase the amount of light ray emitted at two ends of the display panel, compensate light ray at areas of the display panel where there are less light ray, thus providing a uniform brightness across the display panel, and improving the display effect and the energy efficiency of the display test.

For instance, when the observation distance H1 is smaller than or equals to the predefined distance H2, the angle controlling unit 300 can de-energize the first magnetic field component 2012 and/or the second magnetic field component 2013, so that the first magnetic field component 2012 and the second magnetic field component 2013 are separated from each other to form the preset angle β.

Further, when the observation distance H1 is larger than the predefined distance H2, the angle controlling unit 300 energizes the first magnetic field component 2012 and/or the second magnetic field component 2013, so that the first magnetic field component 2012 and the second magnetic field component 2013 are attracted to each other to eliminate the preset angle β.

Therefore, upon being energized, the first magnetic field component 2012 and the second magnetic field component 2013 have opposite magnetic properties, so that the first magnetic field component 2012 and the second magnetic field component 2013 can be attracted to each other in the energized state.

The predefined distance H2 can be 1-10 times of the width of the display panel of the display device. For instance, the predefined distance H2 can be 5 times of the width of the display panel. When the predefined distance H2 equals to the width of the display panel, the distance between the user and the display device is too small, and the observing effect and comfort is affected. When the predefined distance H2 is 10 times of the width of the display panel, the distance between the user and the display device is too large, and the user possibly can not clearly what is displayed.

Fourth Embodiment

As shown in FIG. 6, in case that the first magnetic field component 2012 covers the whole surface of the bendable part 2011 which is close to the backplate 200, the second magnetic field component 2013 covers the whole surface of the backplate 200 which is close to the bendable part 2011, the first magnetic field component 2012 is composed of a ferrous coating, and the second magnetic field component 2013 is composed of an electromagnet, when the observation distance H1 is smaller than or equals to 5 times of the width of the display panel 112, the triggering module 300 sends the first controlling signal, and according to the first controlling signal, the processing module 3002 de-energizes the first magnetic field component 2012 and/or the second magnetic field component 2013, so that the first magnetic field component 3012 and the second magnetic field component 2013 are separated from each other to form the preset angle β. In this manner, the direction of light ray emitted by the backlight can be modified by the preset angle β, and the amount of light ray emitted at two ends of the display panel 112 can be compensated, so that the brightness is uniform across the display panel 112.

Besides, in case that the observation distance H1 is smaller than or equals to 5 times of the width of the display panel 112, when the observation distance H1 increases gradually, the triggering module 300 sends the first controlling signal, and according to the first controlling signal, the processing module 3002 can increase gradually the current which is fed into the first magnetic field component 2012 and/or the second magnetic field component 2013. As a result, a portion of the first magnetic field component 2012 and a portion of the second magnetic field component 2013 are attracted to each other, so that the light emitting unit 201 is partially attached to the surface of the backplate 200, thus decreasing the preset angle β. Particularly, as shown in FIG. 6, according to the first controlling signal, the processing module 3002 increases gradually the current which is fed into the second magnetic field component 2013. In this manner, a portion of the first magnetic field component 2012 which is close to the second magnetic field component 2013 is attracted to the second magnetic field component 2013. As the current further increases, a portion of the first magnetic field component 2012 which is far from the second magnetic field component 2013 is gradually attracted to the second magnetic field component 2013, thus decreasing the preset angle β. In this manner, the extent to which the light ray is compensated at areas of the display panel where there is less light ray can vary according to the observation distance H1, thus providing an improved display effect.

Figure 9:
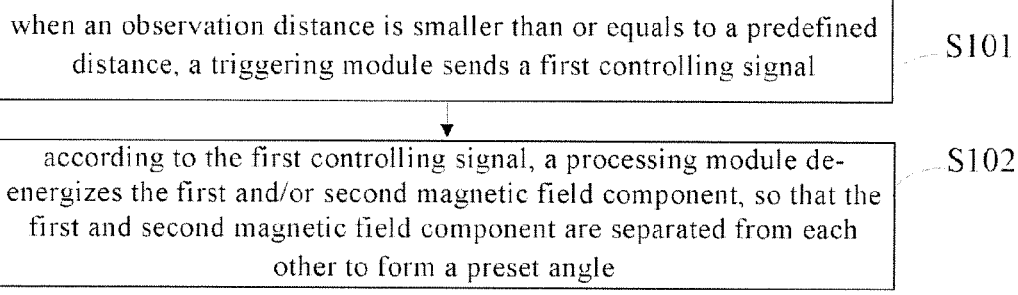
FIG. 9 is a flow chart illustrating a method for controlling backlighting of a display device according to the present disclosure.

In case that the angle controlling unit 300 comprises a triggering module 3001 and a processing module 3002, as shown in FIG. 9, the backlight controlling method can comprise the following steps of S101 and S102.

In the step S101, when the observation distance H1 is smaller than or equals to the predefined distance H2, the triggering module 300 sends the first controlling signal.

For instance, when the observation distance H1 is smaller than or equals to the predefined distance H2, the user can press the control button, so that the control button sends the first controlling signal. Also, when the observation distance H1 of the user obtained by the front camera or the infrared induction lamp remote sensing device is smaller than or equals to the predefined distance H2, the front camera or the infrared induction lamp remote sensing device sends the first controlling signal to the processing module 3002.

In the step S102, according to the first controlling signal, the processing module 3002 de-energizes the first magnetic field component 2012 and/or the second magnetic field component 2013, the first magnetic field component 2012 and the second magnetic field component 2013 are separated from each other to form the preset angle β.

Figure 10:
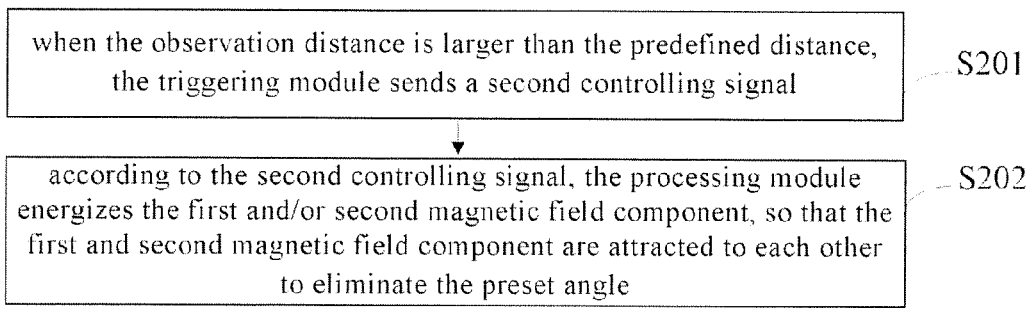
FIG. 10 is a flow chart illustrating another method for controlling backlighting of a display device according to the present disclosure.

Further, as shown in FIG. 10, the backlight controlling method can comprises the following steps of S201 and S202.

In the step S201, when the observation distance H1 is larger than the predefined distance H2, the triggering module 300 sends the second controlling signal.

For instance, when the observation distance H1 is larger than the predefined distance H2, the user can press the control button, so that the control button sends the second controlling signal. Also, when the observation distance H1 of the user obtained by the front camera or the infrared induction lamp remote sensing device is smaller than or equals to the predefined distance H2, the front camera or the infrared induction lamp remote sensing device sends the second controlling signal to the processing module 3002.

In the step S202, according to the second controlling signal, the processing module 3002 energizes the first magnetic field component 2012 and/or the second magnetic field component 2013, so that the first magnetic field component 2012 and the second magnetic field component 2013 are attracted to each other to eliminate the preset angle β.

In this manner, when the observation distance H1 is larger than the predefined distance H2, since differences among angles between each light ray which is perceived by human eyes 111 or the test equipment 113 and the normal of the display panel 112 are very small, it is not necessary to compensate light ray at two ends of the display panel 112 by using the preset angle β to compensate light ray at areas where there are less light ray, and the preset angle β can be decreased to zero.

Fifth Embodiment

When the observation distance H1 is larger than 5 times of the width of the display panel 112, the triggering module 300 sends the second controlling signal, and according to the second controlling signal, the processing module 3002 energizes the first magnetic field component 2012 and/or the second magnetic field component 2013, so that the first magnetic field component 2012 and the second magnetic field component 2013 are attracted to each other, and the light emitting unit 201 is completely attached to the surface of the backplate 200 to eliminate the preset angle β. When the observation distance H1 is larger than 5 times of the width of the display panel 112, since differences among angles between each light ray which is perceived by human eyes 111 or the test equipment 113 and the normal of the display panel 112 are very small, it is not necessary to modify the direction of light ray emitted by the backlight by the preset angle β so as to compensate light ray at two ends of the display panel 112.

Besides, as shown in FIG. 6, in case that the observation distance H1 is larger than 5 times of the width of the display panel 112, when the observation distance H1 increases gradually, the triggering module 300 sends the second controlling signal, and according to the second controlling signal, the processing module 3002 can increase gradually the current which is fed into the second magnetic field component 2013. In this manner, a portion of the first magnetic field component 2012 which is close to the second magnetic field component 2013 is attracted to the second magnetic field component 2013. As the current further increases, a portion of the first magnetic field component 2012 which is far from the second magnetic field component 2013 is gradually attracted to the second magnetic field component 2013, so that the angle controlling unit 300 can decrease gradually and finally eliminate the preset angle β. Of course, reference has been made to an example in which the magnitude of the preset angle β is controlled by the angle controlling unit. There exist other controlling procedures for controlling the magnitude of the preset angle β. Although these controlling procedures are not described in details herein, they still fall within the scope of the present disclosure.

Further, in the energized state, the first magnetic field component 2012 and the second magnetic field component 2013 can have the same magnetic properties, so that the first magnetic field component 2012 and the second magnetic field component 2013 can be repelled and thus separated from each other in the energized state.

Particularly, when the observation distance H1 is smaller than or equals to the predefined distance H2, the angle controlling unit 300 energizes the first magnetic field component 2012 and/or the second magnetic field component 2013, so that the first magnetic field component 2012 and the second magnetic field component 2013 are separated from each other to form the preset angle β. When the observation distance H1 is larger than the predefined distance H2, the angle controlling unit 300 de-energizes the first magnetic field component 2012 and/or the second magnetic field component 2013, so that the first magnetic field component 2012 and the second magnetic field component 2013 are attracted to each other to eliminate the preset angle β.

In case that the angle controlling unit 300 comprises a triggering module 3001 and a processing module 3002, as shown in FIG. 11, the backlight controlling method can comprise the following steps of S301 and S302.

In the step S301, when the observation distance H1 is smaller than or equals to the predefined distance H2, the triggering module 300 sends a first controlling signal.

In the step S302, according to the first controlling signal, the processing module 3002 energizes the first magnetic field component 2012 and/or the second magnetic field component 2013, so that the first magnetic field component 2012 and the second magnetic field component 2013 are separated from each other to form the preset angle β.

Further, as shown in FIG. 12, the backlight controlling method can further comprise the following steps of S401 and S402.

In the step S401, when the observation distance H1 is larger than the predefined distance H2, the triggering module 300 sends a second controlling signal.

In the step S402, according to the second controlling signal, the processing module 3002 de-energizes the first magnetic field component 2012 and/or the second magnetic field component 2013, so that the first magnetic field component 2012 and the second magnetic field component 2013 are attracted to each other to eliminate the preset angle.

In this manner, when the observation distance H1 is larger than the predefined distance H2, since differences among angles between each light ray which is perceived by human eyes 111 or the test equipment 113 and the normal of the display panel 112 are very small, it is not necessary to compensate light ray at two ends of the display panel 112 by using the preset angle β to compensate light ray at areas where there are less light ray, and the preset angle β can be decreased to zero.

It will be understood by the ordinary skilled in the art that, all or some of the steps for realizing the above method embodiments can be fulfilled by hardware which is associated with programs or instructions. These programs or instructions can be stored in a computer readable storage medium, and when executed, implement steps comprised in the above method embodiments. The storage medium can comprise ROM, RAM, diskettes, optical discs, or various media in which programs and codes can be stored.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:

1. A backlight, comprising a backplate and a light emitting unit which is arranged on a surface of the backplate, wherein the light emitting unit comprises a substrate and a plurality of light sources which are fixed onto the substrate, and wherein the substrate comprises an attached part which is fixed to a central area of the surface of the backplate and a bendable part which forms a preset angle with a non-central area of the surface of the backplate, wherein the bendable part is bendable with respect to the attached part to vary the preset angle.

2. The backlight of claim 1,
wherein at least a first magnetic field component is arranged on a surface of the bendable part which is close to the backplate, and at least a second magnetic field component is arranged on a surface of the backplate which is close to the bendable part and at a position corresponding to the first magnetic field component; and
wherein when the first and/or second magnetic field component is energized, the first and second magnetic field component are attracted to each other completely or partially.

3. The backlight of claim 2,
wherein the first magnetic field component is composed of a ferrous coating, and the second magnetic field component is composed of an electromagnet;
wherein the first magnetic field component is composed of an electromagnet, and the second magnetic field component is composed of a ferrous coating; or
wherein both the first and second magnetic field component are composed of an electromagnet.

4. The backlight of claim 3,
wherein when the first magnetic field component is composed of the electromagnet, an insulating layer is arranged between the bendable part and the first magnetic field component; and
wherein when the second magnetic field component is composed of the electromagnet, an insulating layer is arranged between the second magnetic field component and the backplate.

5. The backlight of claim 2, wherein the backlight further comprises an angle controlling unit for adjusting the preset angle according to an observation distance.

6. The backlight of claim 5, wherein the angle controlling unit comprises:
a triggering module for sending a first or second controlling signal according to the observation distance; and
a processing module for controlling the first and/or second magnetic field component to be de-energized or energized according to the first or second controlling signal.

7. The backlight of claim 6, wherein the triggering module comprises a control button, a front camera, or a remote sensing device with an infrared induction lamp.

8. The backlight of claim 1,
wherein at least a first magnetic field component is arranged on a surface of the bendable part which is close to the backplate, and at least a second magnetic field component is arranged on a surface of the backplate which is close to the bendable part and at a position corresponding to the first magnetic field component; and
wherein when the first and/or second magnetic field component is energized, the first and second magnetic field component are separated from each other completely or partially.

9. The backlight of claim 1, wherein the substrate comprises a multilayer printed circuit board.

10. A display device comprising the backlight of claim 1.

11. A method for controlling backlighting of a display device, wherein the display device comprises a backlight, the backlight comprises a backplate and a light emitting unit which is arranged on a surface of the backplate, wherein the light emitting unit comprises a substrate and a plurality of light sources which are fixed onto the substrate, and wherein the substrate comprises an attached part which is fixed to a central area of the surface of the backplate and a bendable part which forms a preset angle with a non-central area of the surface of the backplate,
wherein the method comprises adjusting the preset angle of the bendable part according to an observation distance.

12. The method of claim 11,
wherein when the observation distance is smaller than or equals to a predefined distance, de-energizing the first and/or second magnetic field component, so that the first and second magnetic field component are separated from each other to form the preset angle; and
wherein when the observation distance is larger than the predefined distance, energizing the first and/or second magnetic field component, so that the first and second magnetic field component are attracted to each other to eliminate the preset angle.

13. The method of claim 12, wherein, in case an angle controlling unit comprises a triggering module and a processing module is used to adjust the preset angle, the method comprises:
when the observation distance is smaller than or equals to the predefined distance, sending a first controlling signal by using the triggering module,
according to the first controlling signal, de-energizing the first and/or second magnetic field component by using the processing module, so that the first and second magnetic field component are separated from each other to form the preset angle; and
when the observation distance is larger than the predefined distance, sending a second controlling signal by using the triggering module,
according to the second controlling signal, energizing the first and/or second magnetic field component by using the processing module, so that the first and second magnetic field component are attracted to each other to eliminate the preset angle.

14. The method of claim 12, wherein the predefined distance is 1-10 times of a width of a display panel of the display device.

15. The method of claim 11,
wherein when the observation distance is smaller than or equals to the predefined distance, energizing the first and/or second magnetic field component, so that the first and second magnetic field component are separated from each other to form the preset angle; and
wherein when the observation distance is larger than the predefined distance, de-energizing the first and/or second magnetic field component, so that the first and second magnetic field component are attracted to each other to eliminate the preset angle.

16. The method of claim 15, wherein, in case an angle controlling unit comprises a triggering module and a processing module is used to adjust the preset angle, the method comprises:

when the observation distance is smaller than or equals to the predefined distance, sending a first controlling signal by using the triggering module,
according to the first controlling signal, energizing the first and/or second magnetic field component by using the processing module, so that the first and second magnetic field component are separated from each other to form the preset angle; and
when the observation distance is larger than the predefined distance, sending a second controlling signal by using the triggering module,
according to the second controlling signal, de-energizing the first and/or second magnetic field component by using the processing module, so that the first and second magnetic field component are attracted to each other to eliminate the preset angle.

* * * * *